Patented Mar. 10, 1936

2,033,684

UNITED STATES PATENT OFFICE 2,033,684

SEPARATION OF TERTIARY BUTYL ALCOHOL

Gerald H. Coleman and Glenn W. Warren, Midland, Mich., assignors to The Dow Chemical Company, Midland, Mich., a corporation of Michigan No Drawing. Application December 4, 1933, Serial No. 700,876

4 Claims. (Cl. 202—42)

This invention concerns an improved method of separating tertiary butyl alcohol from a mixture thereof with chlorinated derivatives of isobutane, e. g. isobutyl chloride, polychloro-isobutanes, chloro-isobutylenes, etc.

When isobutane is chlorinated by usual methods a complex and difficultly separable mixture containing tertiary butyl chloride, isobutyl chloride, polychloro-isobutane, chloro-isobutylenes, etc., is formed. A method of selectively hydrolyzing the tertiary butyl chloride contained in such mixture is described in a co-pending application of E. C. Britton et al., Serial No. 647,178, filed December 14, 1932.

Although the tertiary butyl chloride contained in a chlorinated isobutane mixture can selectively be hydrolyzed to produce tertiary butyl alcohol in good yield, said alcohol can not be separated completely and in pure form from the hydrolysis mixture by usual procedure.

When attempts are made to extract the tertiary butyl alcohol from the hydrolysis mixture with water, a portion of the chlorinated isobutane derivatives present become intermixed or emulsified with the aqueous extract, with the result that the alcohol obtained is impure. Such intermixing or emulsifying action appears to be due either to the presence of the polychlorinated isobutane derivatives, e. g. polychloro-isobutanes, polychloro-isobutylenes, etc., or to the presence of hydrolysis products of such polychlorinated compounds in the hydrolysis mixture, for tertiary butyl alcohol can be extracted with water readily and in substantially pure form from a mixture thereof with monochlorinated isobutane derivatives, e. g. isobutyl chloride or monochloro-isobutylene.

When an attempt is made to separate tertiary butyl alcohol from the aforementioned hydrolysis mixture by distilling the latter, the first portion, e. g. about two-thirds, of the tertiary butyl alcohol distills over as a mixture thereof with water, isobutyl chloride, and monochloro-isobutylene. Tertiary butyl alcohol can be extracted in substantially pure form from this fraction of the distillate with water. The last portion, e. g. about one-third, of the tertiary butyl alcohol distilling over is contaminated with polychloro-isobutanes, polychloro-isobutylenes and/or hydrolysis and decomposition products of said polychlorinated compounds which can not readily be separated from the alcohol either by redistillation or by extraction with water.

We have now found that the first fraction of distillate described above, i. e. the fraction from which substantially pure tertiary butyl alcohol can be extracted, consists of an azeotropic mixture of tertiary butyl alcohol, isobutyl chloride, monochloro-isobutylene, and water. A crude hydrolysis mixture obtained in the manner hereinbefore described does not, however, contain sufficient isobutyl chloride and monochloro-isobutylene to permit all of the tertiary butyl alcohol to be distilled therefrom as such azeotropic mixture, with the result that the last portion of tertiary butyl alcohol distilled off is contaminated with impurities which can not readily be removed therefrom.

We have discovered that tertiary butyl alcohol can be separated readily, in good yield, and in substantially pure form from a hydrolysis mixture such as that hereinbefore described by adding to said mixture sufficient isobutyl chloride to permit all of the tertiary butyl alcohol to be distilled from the mixture as an azeotropic mixture of said alcohol, water, isobutyl chloride and monochloro-isobutylene, distilling such azeotropic mixture from the hydrolysis mixture, and extracting tertiary butyl alcohol from the distillate with water.

The invention, then, consists in the method of separating tertiary butyl alcohol from a hydrolysis mixture hereinafter fully described and particularly pointed out in the claims, the following description and example setting forth in detail only certain of the various ways in which the principle of our invention may be employed.

An aqueous hydrolysis mixture, prepared by chlorinating isobutane and selectively hydrolyzing the tertiary butyl chloride contained in the chlorinated products, is treated with sufficient isobutyl chloride so that the total quantity of isobutyl chloride and monochloro-isobutylene in the mixture represents at least 6.67 times the weight of the tertiary butyl alcohol present. The mixture is then fractionally distilled to separate an azeotropic mixture distilling at approximately 60° C. at atmospheric pressure, i. e. 750 millimeters pressure, and consisting substantially of 12.3 parts by weight of tertiary butyl alcohol, 5.6 parts of water, and 82 parts of isobutyl chloride or isobutyl chloride plus monochloro-isobutylene, depending upon whether or not monochloro-isobutylene is present in the hydrolysis mixture. The composition of the azeotropic mixture is dependent to some extent, of course, on the pressure at which the distillation is carried out, and can be varied by changing said pressure. The distillation is preferably, though not necessarily, carried out in the presence of a base, e. g. sodium hydroxide, sodium carbonate, lime, barium hydroxide, etc., since bases inhibit decomposition of the polychlorinated compounds present.

The azeotropic mixture so-obtained is extracted with water to obtain an aqueous solution of purified tertiary butyl alcohol.

Instead of operating in the manner described above, we prefer to practice the invention as follows:—

1. A portion of the tertiary butyl alcohol present in a crude hydrolysis mixture such as that hereinbefore described is distilled off as an azeotropic mixture of said alcohol, water, isobutyl chloride and monochloro-isobutylene.

2. During the distillation, substantially pure tertiary butyl alcohol is extracted continuously with water from the azeotropic mixture collected as a distillate.

3. The isobutyl chloride and monochloro-isobutylene mixture remaining after the extraction is returned continuously to the still until all of the tertiary butyl alcohol has been distilled from the hydrolysis mixture.

By operating in such manner, tertiary butyl alcohol can be separated in good yield and substantially pure form from a crude hydrolysis mixture without employing any isobutyl chloride other than that which initially is present in the hydrolysis mixture.

The following example illustrates one way in which the principle of our invention has been applied, but is not to be construed as limiting the invention.

*Example*

The tertiary butyl chloride in a crude chlorinated isobutane mixture was selectively hydrolyzed to obtain an aqueous hydrolysis mixture containing 406 pounds of tertiary butyl alcohol, 1542 pounds of isobutyl chloride, 228 pounds of monochloro-isobutylene, and 1314 pounds of other organic materials consisting principally of polychloro-isobutanes, polychloro-isobutylenes, isobutane, and isobutylene. 1035 pounds of isobutyl chloride was added to the hydrolysis mixture so that the latter contained approximately 7 parts by weight of isobutyl chloride plus monochloro-isobutylene per part of tertiary butyl alcohol. The mixture was then fractinally distilled, whereby an azeotropic mixture, distilling at approximately 60° C. at atmospheric pressure and consisting substantially of 406 pounds of tertiary butyl alcohol, 2577 pounds of isobutyl chloride, 228 pounds of monochloro-isobutylene, and 190 pounds of water, was separated. The azeotropic mixture was extracted with water in a continuous extractor, whereby an aqueous solution containing approximately 400 pounds of purified tertiary butyl alcohol was obtained.

Although the azeotropic mixture described in the above example contained water, tertiary butyl alcohol, isobutyl chloride, and monochloro-isobutylene, the azeotropic mixture distilled from a hydrolysis mixture may, in some instances, consist only of water, tertiary butyl alcohol, and isobutyl chloride. For instance, by fractionally distilling a hydrolyzed chlorinated isobutane mixture which contains no monochloro-isobutylene, an azeotropic mixture consisting only of water, tertiary butyl alcohol, and isobutyl chloride can be obtained. Regardless of whether or not the azeotropic mixture contains monochloro-isobutylene, said mixture always boils at approximately 60° C. at atmospheric pressure and contains approximately 5.6 per cent its weight of water, 12.3 per cent of tertiary butyl alcohol, and 82 per cent of either or both of the compounds isobutyl chloride and monochloro-isobutylene.

The isobutyl chloride may, of course, be added to a hydrolysis mixture either prior to or during the operation of distilling the azeotropic mixture from said hydrolysis mixture.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of separating tertiary butyl alcohol from an aqueous hydrolysis mixture prepared by selectively hydrolyzing the tertiary butyl chloride contained in a chlorinated isobutane mixture, the steps which consist in adding to said hydrolysis mixture sufficient isobutyl chloride so that the mixture will contain at least 6.67 parts by weight of at least one compound selected from the class consisting of isobutyl chloride and monochloro-isobutylene per part of tertiary butyl alcohol, and distilling from the mixture an azeotropic mixture of water, tertiary butyl alcohol, and at least one compound selected from the class consisting of isobutyl chloride and monochloro-isobutylene.

2. In a method of separating tertiary butyl alcohol from an aqueous hydrolysis mixture prepared by selectively hydrolyzing the tertiary butyl chloride contained in a chlorinated isobutane mixture, the steps which consist in adding to said hydrolysis mixture sufficient isobutyl chloride so that the mixture will contain at least 6.67 parts by weight of at least one compound selected from the class consisting of isobutyl chloride and monochloro-isobutylene per part of tertiary butyl alcohol, fractionally distilling substantially all of the tertiary butyl alcohol from the mixture as an azeotropic mixture thereof with water and at least one compound selected from the class consisting of isobutyl chloride and monochloro-isobutylene, and extracting tertiary butyl chloride from said azeotropic mixture with water.

3. In a method of separating tertiary butyl alcohol from an aqueous hydrolysis mixture prepared by selectively hydrolyzing the tertiary butyl chloride contained in a chlorinated isobutane mixture, the steps which consist in fractionally distilling from said hydrolysis mixture an azeotropic mixture of water, tertiary butyl alcohol, and at least one compound selected from the class consisting of isobutyl chloride and monochloro-isobutylene, during the distillation adding isobutyl chloride to the hydrolysis mixture at a rate and in amount sufficient to permit all of the tertiary butyl alcohol to be distilled from said hydrolysis mixture in said azeotropic mixture, and continuing the distillation until substantially all of the tertiary butyl alcohol has been distilled from the hydrolysis mixture.

4. In a method of separating tertiary butyl alcohol from an aqueous mixture containing said alcohol, isobutyl chloride, and polychlorinated isobutane derivatives, the steps which consist in fractionally distilling from said mixture an azeotropic mixture containing water, tertiary butyl alcohol, and isobutyl chloride, during said distillation extracting tertiary butyl alcohol from the distillate with water, returning at least a portion of the isobutyl chloride in the distillate to the still, and continuing said operations until substantially all of the tertiary butyl alcohol has been distilled from the initial mixture.

GERALD H. COLEMAN.
GLENN W. WARREN.